United States Patent
Coulston

(10) Patent No.: US 10,061,329 B1
(45) Date of Patent: Aug. 28, 2018

(54) FLOW CONTROL SYSTEM FOR A TUBULAR

(71) Applicant: Stephen Coulston, Houston, TX (US)

(72) Inventor: Stephen Coulston, Houston, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 0 days.

(21) Appl. No.: 15/657,611

(22) Filed: Jul. 24, 2017

(51) Int. Cl.
*E21B 34/08* (2006.01)
*E21B 43/12* (2006.01)
*G05D 11/00* (2006.01)
*G05D 7/01* (2006.01)
*E21B 34/10* (2006.01)

(52) U.S. Cl.
CPC ............ *G05D 11/008* (2013.01); *E21B 34/08* (2013.01); *E21B 34/101* (2013.01); *G05D 7/018* (2013.01); *E21B 43/126* (2013.01)

(58) Field of Classification Search
CPC ........ E21B 34/08; E21B 34/101; E21B 43/12; E21B 43/126; G05D 7/018; G05D 11/008
See application file for complete search history.

(56) References Cited

U.S. PATENT DOCUMENTS

| | | | | |
|---|---|---|---|---|
| 3,642,171 A * | 2/1972 | Ernst | ........................ | B01J 4/02 137/98 |
| 5,839,508 A * | 11/1998 | Tubel | ................. | E21B 41/0085 166/65.1 |
| 7,002,261 B2 * | 2/2006 | Cousins | .............. | E21B 41/0085 290/43 |
| 7,504,963 B2 * | 3/2009 | Hall | ...................... | E21B 17/003 340/854.8 |
| 7,906,861 B2 * | 3/2011 | Guerrero | ............. | E21B 41/0085 290/1 A |
| 8,033,328 B2 * | 10/2011 | Hall | ..................... | E21B 41/0085 166/65.1 |
| 8,127,833 B2 * | 3/2012 | Pabon | ..................... | E21B 47/00 166/254.2 |
| 9,234,404 B2 * | 1/2016 | Felten | ..................... | E21B 43/08 |
| 9,461,469 B2 * | 10/2016 | Li | ............................. | H02J 3/12 |
| 9,638,009 B2 * | 5/2017 | Kim | ................... | E21B 41/0085 |
| 2013/0153242 A1 * | 6/2013 | Flight | ................. | E21B 33/0355 166/363 |

OTHER PUBLICATIONS

Mircea Eremia, Mohammad Shahidehpour; "Handbook of Electrical Power System Dynamics: Modeling, Stability, and Controlo;" Book; 2004; p. 590; section 3.6.32 The Actuator; Published by Wiley-IEEE Press.

* cited by examiner

*Primary Examiner* — Matthew R Buck
(74) *Attorney, Agent, or Firm* — Cantor Colburn LLP

(57) ABSTRACT

A flow control system for a downhole system includes a tubular having an outer surface, an inner surface defining a flow path, and at least one cavity defined between the outer surface and the inner surface. A first opening formed in the outer surface fluidically connected with the at least one cavity, a second opening formed in the inner surface fluidically connecting the at least one cavity with the flow path. At least one impeller rotatably mounted in the at least one cavity, and a flow control device operatively coupled to the impeller, the flow control device selectively adjusting a rotational impedance of the at least one impeller to control fluid flow between the first opening and the second opening.

15 Claims, 3 Drawing Sheets

FLOW CONTROL SYSTEM FOR A TUBULAR

BACKGROUND

Downhole systems employ various devices to control fluid flow. In some cases, it may be desirable to induce a pressure drop in fluid flowing from an annulus into downhole tubing. In such cases, fluid is typically directed through a labyrinth or convoluted passage. Pressure drops/changes may be controlled by adjusting a length of the convoluted passage. Typically, a tool is run downhole and connected to a valve actuator. The valve actuator is shifted to change a length of the convoluted passage in order to achieve a selected pressure drop. In other cases, an electrical actuator may be employed to adjust the length of the convoluted passage. In either case, adjusting a length of the convoluted passage requires a significant input force.

SUMMARY

A flow control system for a downhole system includes a tubular having an outer surface, an inner surface defining a flow path, and at least one cavity defined between the outer surface and the inner surface. A first opening formed in the outer surface fluidically connected with the at least one cavity. A second opening formed in the inner surface fluidically connecting the at least one cavity with the flow path. At least one impeller rotatably mounted in the at least one cavity; and a flow control device operatively coupled to the impeller, the flow control device selectively adjusting a rotational impedance of the at least one impeller to control fluid flow between the first opening and the second opening.

A resource exploration and recovery system includes a surface system, and a downhole system operatively and fluidically connected to the surface system, the downhole system includes a string of tubulars including a flow control system, at least one tubular of the string of tubulars includes a tubular having an outer surface, an inner surface defining a flow path, and at least one cavity defined between the outer surface and the inner surface. A first opening formed in the outer surface fluidically connected with the at least one cavity. A second opening formed in the inner surface fluidically connecting the at least one cavity with the flow path. At least one impeller rotatably mounted in the at least one cavity and a flow control device operatively coupled to the impeller, the flow control device selectively adjusting a rotational impedance of the at least one impeller to control fluid flow between the first opening and the second opening.

BRIEF DESCRIPTION OF THE DRAWINGS

Referring now to the drawings wherein like elements are numbered alike in the several Figures.

DETAILED DESCRIPTION

Figure 1:
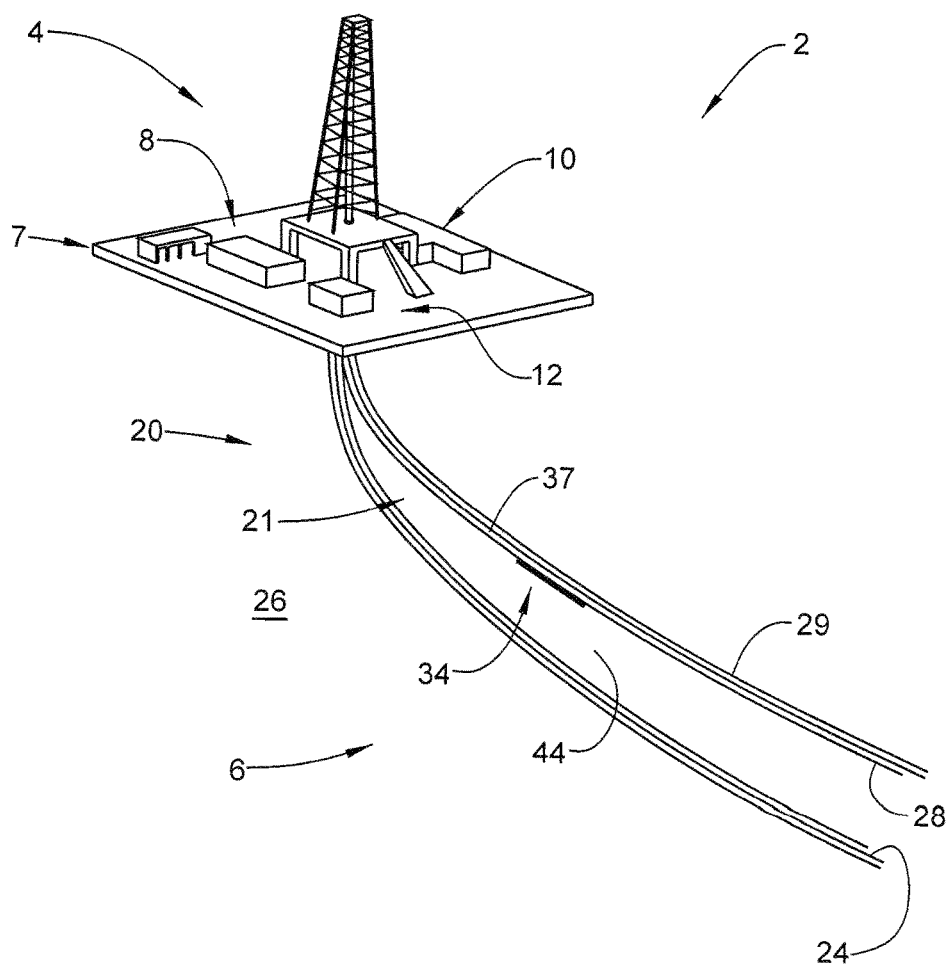
FIG. 1 depicts a resource exploration and recovery system including a tubular having a flow control system, in accordance with an exemplary embodiment.

A resource exploration and recovery system, in accordance with an exemplary embodiment, is indicated generally at 2, in FIG. 1. Resource exploration and recovery system 2 should be understood to include well drilling operations, resource extraction and recovery, $CO_2$ sequestration, and the like. Resource exploration and recovery system 2 may include a surface system 4 operatively and fluidically connected to a downhole system 6. Surface system 4 may include pumps 8 that aid in completion and/or extraction processes as well as fluid storage 10. Fluid storage 10 may contain a gravel pack fluid or slurry (not shown) or other fluid which may be introduced into downhole system 6. Surface system 4 may also include a control system 12 that may monitor and/or activate one or more downhole operations.

Downhole system 6 may include a downhole string 20 formed from a plurality of tubulars, one of which is indicated at 21 that is extended into a wellbore 24 formed in formation 26. Wellbore 24 includes an annular wall 28 that may be defined by a wellbore casing 29 provided in wellbore 24. Of course, it is to be understood, that annular wall 28 may also be defined by formation 26. Downhole string 20 may include a flow control system 34 operatively associated with a tubular 37 of one of the plurality of tubulars 21.

Figure 2:
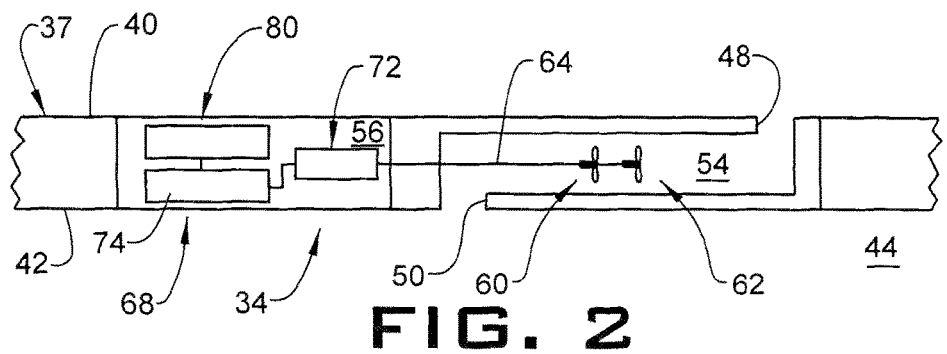
FIG. 2 depicts a cross-sectional view of the flow control system of FIG. 1.

With reference to FIG. 2, tubular 37 includes an outer surface 40 and an inner surface 42 defining a flow path 44. A first opening 48 is formed in outer surface 40 and a second opening 50 is formed in inner surface 42. A first cavity 54 is formed between outer surface 40 and inner surface 42. First cavity 54 is fluidically connected with first opening 48 and second opening 50. Specifically, fluids may pass through first cavity 54 from wellbore 24 into flow path 44 or fluids may flow from flow path 44 to wellbore 24 through first cavity 54. A second cavity 56 is arranged between outer surface 40 and inner surface 42.

In accordance with an exemplary embodiment, a first impeller 60 is rotatably arranged in first cavity 54. A second impeller 62 may also be arranged in first cavity 54. The number of impellers arranged in first cavity 54 may vary. First and second impeller 60 and 62 are rotatably supported by a shaft 64 that may extend into second cavity 56. Shaft 64 is operatively connected with a flow control device 68 that controls a resistance to rotation of shaft 64.

In accordance with an aspect of an exemplary embodiment, flow control system 34 may include a generator 72 and an electrical load 74. It should be understood that flow control system 34 may take on a variety of forms including clutches and other mechanisms that may impede rotation of shaft 64. Generator 72 may be coupled to first and second impellers 60 and 62 through shaft 64. Electrical load 74 may be electrically coupled to an output of generator 72. A controller 80 may be operatively connected with electrical load 74. It should be understood that controller 80 may draw part or all of its power from generator 72.

Figure 3:
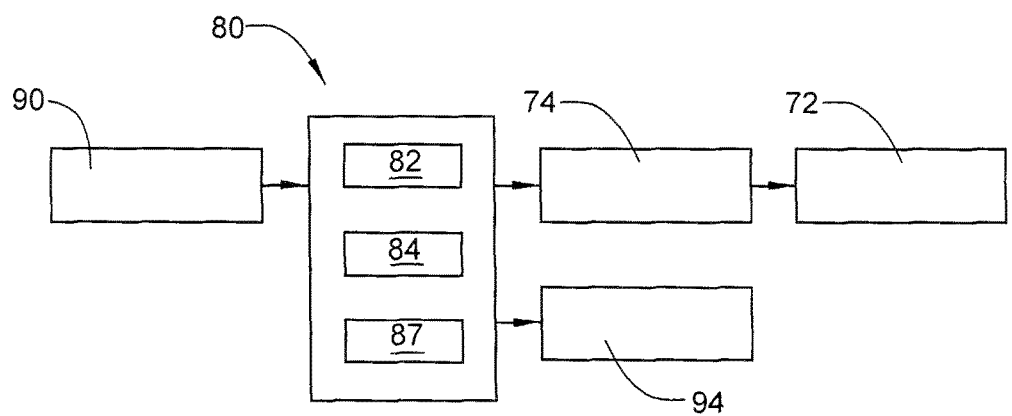
FIG. 3 depicts a control system for the flow control system, in accordance with an aspect of an exemplary embodiment.

As shown in FIG. 3, controller 80 may include a processor 82, a non-volatile memory 84 and a power supply 87. Controller 80 may receive control inputs through a control input device 90 to selectively adjust electrical load 74. By adjusting electrical load 74, rotational speed of shaft 64 imparted by impellers 60 and/or 62 may be selectively controlled. In this manner, fluid flow through first cavity 54 may be controlled to establish a selected pressure drop. Controller 80 may also include a control output device 94 that provides data allowing flow control system 34 to achieve a selected load balance on generator 72.

Figure 4:
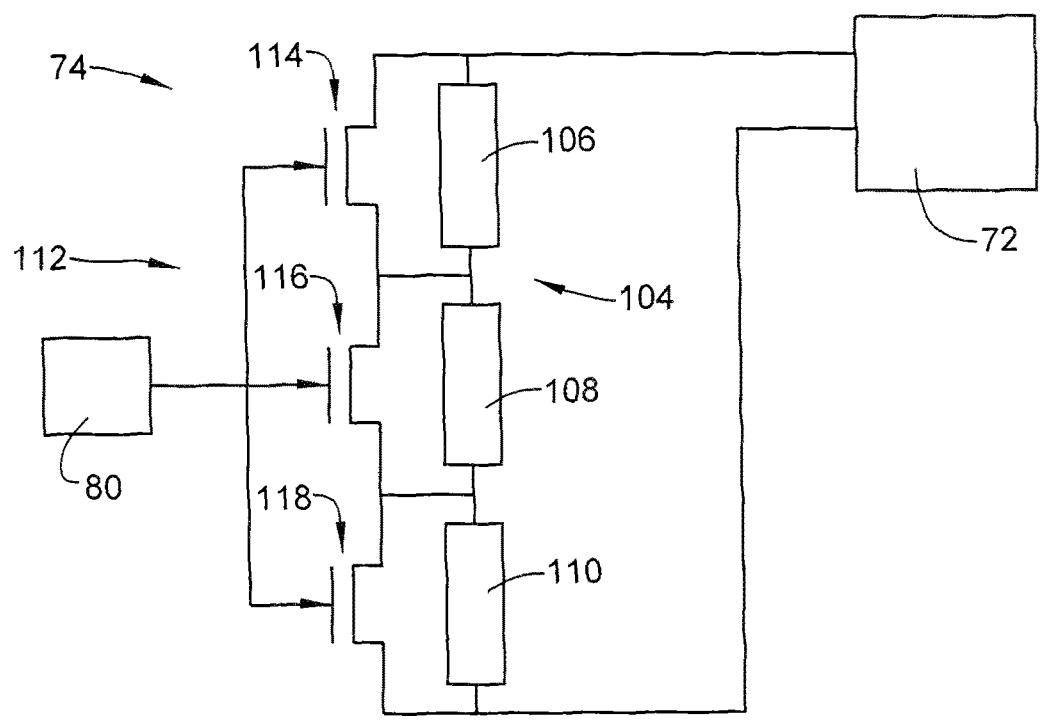
FIG. 4 depicts an electronics module of the control system, in accordance with an aspect of an exemplary embodiment.

In accordance with an exemplary aspect, controller 80 may adjust a resistance of electrical load 74. With reference to FIG. 4, electrical load 74 may include a plurality of resistors 104 including a first resistor 106, a second resistor 108 and a third resistor 110. Electrical load 74 may also include a plurality of switches 112. Each of the plurality of switches 112 may be electrically connected in parallel with a corresponding one of the plurality of resistors 104. For example, a first switch 114 may be connected in parallel with first resistor 106, a second switch 116 may be connected in parallel with second resistor 108 and a third switch 118 may be connected in parallel with third resistor 110. Each switch 114, 116, and 118 may be selectively closed according to control signals from controller 80 to short a corresponding one of resistors 104 to establish a selected electrical load on generator 72. In an embodiment, each of the plurality of switches 112 comprises a transistor. It should be understood that there are various other methodologies for creating an electrical load. The above described methodology for creating a load is exemplary.

Figure 5:
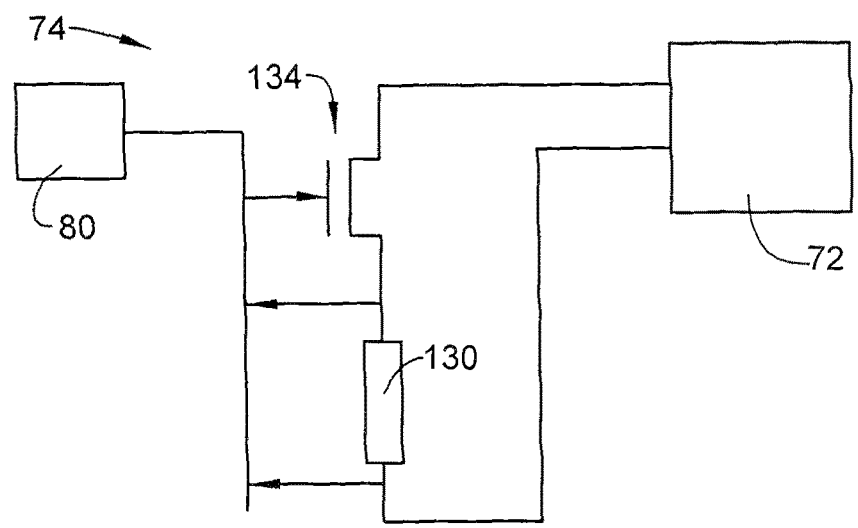
FIG. 5 depicts an electronics module of the control system, in accordance with another aspect of an exemplary embodiment.

FIG. 5 depicts electrical load 74 in accordance with another aspect of an exemplary embodiment. Electrical load 74 includes a resistor 130 electrically connected in series with a selectively adjustable switch 134. Selectively adjustable switch 134 may take the form of a transistor. In operation, controller 80 may control selectively adjustable switch 134 to establish a desired current flow through resistor 130. The selected current flow establishes a desired electrical load on generator 72. By selectively controlling an electrical load at an output of generator 72, rotation of shaft 64 may be selectively impeded (or unimpeded) to control rotation of first and/or second impeller 60, 62. Control of first and/or second impellers 60, 62 may control fluid flow through first cavity 54 to establish a desired pressure drop between first opening 48 and second opening 50.

Set forth below are some embodiments of the foregoing disclosure:

Embodiment 1

A flow control system for a downhole system including a tubular including an outer surface, an inner surface defining a flow path, and at least one cavity defined between the outer surface and the inner surface. A first opening formed in the outer surface fluidically connected with the at least one cavity. A second opening formed in the inner surface fluidically connecting the at least one cavity with the flow path. At least one impeller rotatably mounted in the at least one cavity; and a flow control device operatively coupled to the impeller, the flow control device selectively adjusting a rotational impedance of the at least one impeller to control fluid flow between the first opening and the second opening.

Embodiment 2

The flow control system according as in any prior embodiment, wherein the at least one cavity includes a first cavity fluidically connected to the first opening and the second opening housing the at least one impeller and a second cavity housing the flow control device.

Embodiment 3

The flow control system as in any prior embodiment, wherein the flow control device comprises a generator operatively connected to an electrical load.

Embodiment 4

The flow control system as in any prior embodiment, wherein the electrical load comprises one or more resistors electrically connected in parallel with one or more switches.

Embodiment 5

The flow control system as in any prior embodiment, further comprising: a controller operatively connected to the one or more switches, the controller activating at least one of the one or more switches to bypass a corresponding one of the one or more resistors to adjust an electrical load on the generator.

Embodiment 6

The flow control system as in any prior embodiment, wherein the one or more switches comprise one or more transistors.

Embodiment 7

The flow control system as in any prior embodiment, wherein the electrical load comprises a switch electrically connected in series with at least one resistor.

Embodiment 8

The flow control device as in any prior embodiment, wherein the switch comprises a transistor.

Embodiment 9

The flow control system as in any prior embodiment, further comprising: a controller operatively connected to the transistor, the controller selectively controlling a resistance of the transistor to control current flow through the resistor to adjust an electrical load on the generator.

Embodiment 10

A resource exploration and recovery system including a surface system, and a downhole system operatively and fluidically connected to the surface system, the downhole system including a string of tubulars including a flow control system, at least one tubular of the string of tubulars includes a tubular having an outer surface, an inner surface defining a flow path, and at least one cavity defined between the outer surface and the inner surface. A first opening formed in the outer surface fluidically connected with the at least one cavity. A second opening formed in the inner surface fluidically connecting the at least one cavity with the flow path. At least one impeller rotatably mounted in the at least one cavity and a flow control device operatively coupled to the impeller, the flow control device selectively adjusting a rotational impedance of the at least one impeller to control fluid flow between the first opening and the second opening.

Embodiment 11

The resource exploration and recovery system as in any prior embodiment, wherein the flow control device comprises a generator operatively connected to an electrical load.

Embodiment 12

The resource exploration and recovery system as in any prior embodiment, wherein the electrical load comprises one or more resistors electrically connected in parallel with one or more switches.

Embodiment 13

The resource exploration and recovery system as in any prior embodiment, further comprising: a controller operatively connected to the one or more switches, the controller activating at least one of the one or more switches to bypass a corresponding one of the one or more resistors to adjust an electrical load on the generator.

Embodiment 14

The resource exploration and recovery system as in any prior embodiment, wherein the electrical load comprises a switch electrically connected in series with at least one resistor.

Embodiment 15

The resource exploration and recovery system as in any prior embodiment, further comprising: a controller operatively connected to the switch, the controller selectively controlling a resistance of the switch to control current flow through the resistor to adjust an electrical load on the generator.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

The term "about" is intended to include the degree of error associated with measurement of the particular quantity based upon the equipment available at the time of filing the application. For example, "about" can include a range of ±8% or 5%, or 2% of a given value.

While one or more embodiments have been shown and described, modifications and substitutions may be made thereto without departing from the spirit and scope of the invention. Accordingly, it is to be understood that the present invention has been described by way of illustrations and not limitation.

The invention claimed is:

1. A flow control system for a downhole system comprising:
   a tubular including an outer surface, an inner surface defining a flow path, and at least one cavity defined between the outer surface and the inner surface;
   a first opening formed in the outer surface fluidically connected with the at least one cavity;
   a second opening formed in the inner surface fluidically connecting the at least one cavity with the flow path;
   at least one impeller rotatably mounted in the at least one cavity; and
   a flow control device operatively coupled to the impeller, the flow control device being selectively controlled to adjust a rotational impedance of the at least one impeller to control fluid flow between the first opening and the second opening.

2. The flow control system according to claim 1, wherein the at least one cavity includes a first cavity fluidically connected to the first opening and the second opening housing the at least one impeller and a second cavity housing the flow control device.

3. The flow control system according to claim 1, wherein the flow control device comprises a generator operatively connected to an electrical load.

4. The flow control system according to claim 3, wherein the electrical load comprises one or more resistors electrically connected in parallel with one or more switches.

5. The flow control system according to claim 4, further comprising: a controller operatively connected to the one or more switches, the controller activating at least one of the one or more switches to bypass a corresponding one of the one or more resistors to adjust an electrical load on the generator.

6. The flow control system according to claim 4, wherein the one or more switches comprise one or more transistors.

7. The flow control system according to claim 3, wherein the electrical load comprises a switch electrically connected in series with at least one resistor.

8. The flow control device according to claim 7, wherein the switch comprises a transistor.

9. The flow control system according to claim 8, further comprising: a controller operatively connected to the transistor, the controller selectively controlling a resistance of the transistor to control current flow through the resistor to adjust an electrical load on the generator.

10. A resource exploration and recovery system comprising:

a surface system; and a downhole system operatively and fluidically connected to the surface system, the downhole system including a string of tubulars including a flow control system, at least one tubular of the string of tubulars includes a tubular having an outer surface, an inner surface defining a flow path, and at least one cavity defined between the outer surface and the inner surface;

a first opening formed in the outer surface fluidically connected with the at least one cavity;

a second opening formed in the inner surface fluidically connecting the at least one cavity with the flow path;

at least one impeller rotatably mounted in the at least one cavity; and a flow control device operatively coupled to the impeller, the flow control device being selectively controlled to adjust a rotational impedance of the at least one impeller to control fluid flow between the first opening and the second opening.

11. The resource exploration and recovery system according to claim 10, wherein the flow control device comprises a generator operatively connected to an electrical load.

12. The resource exploration and recovery system according to claim 11, wherein the electrical load comprises one or more resistors electrically connected in parallel with one or more switches.

13. The resource exploration and recovery system according to claim 12, further comprising: a controller operatively connected to the one or more switches, the controller activating at least one of the one or more switches to bypass a corresponding one of the one or more resistors to adjust an electrical load on the generator.

14. The resource exploration and recovery system according to claim 11, wherein the electrical load comprises a switch electrically connected in series with at least one resistor.

15. The resource exploration and recovery system according to claim 14, further comprising: a controller operatively connected to the switch, the controller selectively controlling a resistance of the switch to control current flow through the resistor to adjust an electrical load on the generator.

* * * * *